United States Patent [19]
Rickard

[11] Patent Number: 5,588,000
[45] Date of Patent: Dec. 24, 1996

[54] APPARATUS FOR REORDERING DATA FRAMES WITHIN AN INTERFACE DEVICE

[75] Inventor: Wayne T. Rickard, Oceanside, Calif.

[73] Assignee: Emulex Corporation, Costa Mesa, Calif.

[21] Appl. No.: 410,712

[22] Filed: Mar. 27, 1995

[51] Int. Cl.$^6$ ..................................................... H04L 12/54
[52] U.S. Cl. ........................... 370/428; 370/394; 370/509
[58] Field of Search ............................... 370/60, 60.1, 13, 370/94.1, 18, 82, 61, 105.1, 105.3; 375/371

[56] References Cited

U.S. PATENT DOCUMENTS

| | | | |
|---|---|---|---|
| 4,654,890 | 3/1987 | Hasegawa et al. | 455/607 |
| 5,019,964 | 5/1991 | Yamamoto et al. | 364/200 |
| 5,054,060 | 10/1991 | Werdin et al. | 379/324 |
| 5,142,653 | 8/1992 | Schefts | 379/16 |
| 5,313,323 | 5/1994 | Patel | 359/115 |
| 5,337,410 | 8/1994 | Appel | 395/162 |
| 5,371,734 | 12/1994 | Fischer | 370/18 |

OTHER PUBLICATIONS

Krause, Reinhardt, et al., "New Opportunities May Appear Amid System Vendor Buzzwords", Electronic News, Jan. 3, 1994, pp. 44 and 46.
T. S. Tanenbaum, Computer Networks (2nd Edition), TK5105.5 T36, Prentice Hall, 1988, p. 136–184.
Rickard, W., "Fibre Channel as a Network Backbone," Wescon/1994, pp. 653–659.
Jeffery, Brian, "Where Does the RS/6000 Go Next?" Microage Systems, Dec. 28, 1993, p. 31.
"FCA Supports Advancing Technology for Gigabit Highway", Manufacturing systems, Nov. 1993.
"Active Device Modules", Lasers & Optronics, Dec. 1993.
Mitchell, John, "Fiber Channel Technology Finds Acceptance", Workstation, Dec. 1993.
"1993 Technology Award Finalists", Fiberoptic Product News, Dec. 1993.
Goldberg, Dan, "Fibre Channel Brings the Unimaginable to Reality", Automatic I.D. News, Dec. 1993.
"IBM Microelectronics", Fiberoptic Product News, Dec. 1993.
"The Furukawa Electric Co., Ltd. Affiliates" Fiberoptic Product News, Dec. 1993.
Fahey, Michael, "From Local to Global: Surveying the Fiber Landscape", Nov. 1993, pp. 33–38.
Weber, Sam, "GaAs Making High–Speed Commercial Bid", Electronic Engineering Times, Dec. 13, 1993.
Wirbel, Loring, "Networks Realign to Fit in", Electronic Engineering Times, Dec. 20, 1993, p. 51.
"Maximum Strategy's HIPPI–Based RAID Targets Workstations", Electronic News, Dec. 6, 1993.
Roelandts, Wim, "The Triad of the Future", LAN Computing, Nov. 1993.
Meth, Clifford, "BiCMOS Serial Communications Chips Combine High Speed, Low Power", Electronic Design, Dec. 2, 1993, p. 119.
Costlow, Terry, "FireWire: the Hot New Link?" Electronic Engineering Times, Dec. 20, 1993.
"High–Performance Integrated Circuits", EDN Products Edition, Dec. 13, 1993.
"The Standard in SCSI Tools", EDN Products Edition, Dec. 13, 1993.

*Primary Examiner*—Wellington Chin
*Assistant Examiner*—Melissa Kay Carman
*Attorney, Agent, or Firm*—Fish & Richardson P.C.

[57] ABSTRACT

An apparatus for reordering frames of data within an interface device of a receiving device. The present invention can switch context to allow frames associated with more than one sequence to be handled concurrently. A "Missing Frame Window" is generated and associated with each sequence. Each Missing Frame Window maintains a record of frames of a particular sequence received out of order. When a frame associated with a particular sequence is received out of order, a bit within the Missing Frame Window representing the "missing" frame is asserted to represent receipt of the out of order frame. The out of order frame is then stored to be transferred to a host in order upon receipt of those frames which must be transferred before transfer of the out of order frame.

6 Claims, 3 Drawing Sheets

APPARATUS FOR REORDERING DATA FRAMES WITHIN AN INTERFACE DEVICE

BACKGROUND OF THE INVENTION

1. Field of the Invention

This invention relates to a method and apparatus for digital communications, and more particularly to a method and apparatus for reordering sequential information which has been received out of sequence.

2. Description of Related Art

In the computer industry, a number of protocols exist for moving mass quantities of data over high-speed digital networks. For example, Fibre Channel is emerging as a standard for interconnecting workstations and peripherals within a computer system. Use of the Fibre Channel standard allows as much as 200 Mbytes of data to be transferred in as little as two seconds. Fibre Channel is considered by some to be a high-speed local-area network standard. Fibre Channel is a switched medium. This means that packets of data are transferred by each of the users. Data is transported in packets of two kilobytes or smaller. These packet of data are referred to as "frames". Sequences comprise one or more frames which must be assembled in a predetermined order before the sequence can be considered complete at the receiving device.

FIG. 1 is an illustration of the frame format for a Fibre Channel frame. The first four bytes of the frame are allocated to a "Start-of-Frame" field 101. The Start-of-Frame field 101 is a pattern of data that indicates that a frame follows. The next twenty-four bytes are allocated to a "Frame-Header" field 103. The Frame-Header field 103 includes four subfields that, taken together, uniquely identify the frame. The first of these subfields is a source identification subfield (S-ID). The S-ID subfield is three bytes of information that identifies the device from which the frame originated. The second of these subfields is a destination identification subfield (D-ID). The D-ID subfield is three bytes of information that identifies the device that is intended to receive the frame. The third of these subfields is a sequence identification subfield (SEQ-ID). The SEQ-ID subfield is three bytes that identify the particular sequence with which the frame is associated. The fourth of these subfields is a sequence count subfield (SEQ-CNT). The SEQ-CNT subfield determines the relative order of the frame within the sequence with respect to each of the other frames of that particular sequence.

The next 0–2112 bytes of the frame are allocated to the payload field 105 (i.e., the field that carries the information that is to be transmitted from the source device to the destination device). The next four bytes of the frame are allocated to a cyclical redundancy code (CRC) field 107 which permits errors in the data of the frame to be detected. The last four bytes of the frame are allocated to an "End-of-Frame" field 109.

One problem with communications protocols, such as Fibre Channel, is that data must be received in a predetermined order at the receiving end of a communications link. However, requirements of the communications link can prevent the data from arriving in order. For example, the source device may detect an error in the frame of information and transmit the next frame before correcting the error. After the error has been corrected, the frame that was in error is retransmitted out of order. Transmission of the next frame in order before correction of an error in a previously transmitted frame allows the source device to continue doing productive work (i.e., sending frames of data) while correcting a detected error. In another example, the source device may send frames in the proper order. However, frames may take different paths to the destination device. The result of different transmission delays over the different paths may result in the frames arriving out of order.

While transmission of subsequent frames after detecting an error in a previously transmitted frame, and transmission of frames over different paths, may cause frames to be received out of order, and thus burden the destination device with the task of reordering the frames, such operation allows the source device to exploit the best delivery path and continue to transmit frames of data uninterrupted by errors.

Existing mechanisms for re-sequencing frames either penalize the source device by requiring manual or intelligent intervention at reduced performance, or penalize the system by requiring the sender to re-send the sequential information until it arrives at the destination in the correct order. For example, the TCP (Transport Control Protocol) Transport Layer protocol is a software mechanism that uses the services of Internet Protocol (IP) to provide reliable, ordered stream data delivery. The TCP software process in the receiving system checks each received segment to ensure that there are no missing, duplicated, or out of order segments. This system requires the receiver to intelligently intervene and thus reduces the performance of the receiver.

Accordingly, there is a need for a simple means for reordering frames received by a destination source to conform to the order intended by the source device which does not impact the efficiency and speed of the data communication.

SUMMARY OF THE INVENTION

The present invention is a method and apparatus for reordering frames of data within an interface device of a receiving device. Data is reordered to allow the receiving device to process the data in a predetermined sequential order. In accordance with the present invention, each frame that is transmitted from a source device is assigned a "Sequence Number" that indicates the relative position of that frame with respect to each other frame within a "Sequence" of data. A Sequence comprises one or more frames which must be assembled in a predetermined order before the Sequence can be considered complete at the receiving device. Each Sequence of data is also identified. The present invention can switch context to allow frames associated with more than one Sequence to be handled concurrently. A "Missing Frame Window" is generated and associated with each Sequence. Each Missing Frame Window maintains a record of frames of a particular Sequence received out of order. When a frame of data associated with a particular Sequence is received, the Missing Frame Window associated with that Sequence is preferably loaded into a Missing Frame latch. The Missing Frame Window is preferably an 8-bit word. When a frame associated with a particular Sequence is received out of order, a bit within the Missing Frame Window representing the "missing" frame is asserted to represent receipt of the out of order frame. The out of order frame is then stored to be transferred to a host in order upon receipt of those frames which must be transferred before transfer of the out of order frame.

The least significant bit (LSB) of the Missing Frame Window represents the "next expected frame". The next expected frame is defined as a frame which carries a Sequence Number that has the lowest value within a range of possible values and which has not yet been received. When the LSB is asserted (indicating that the next expected frame has been received) the data carried in the payload field of the next expected frame is transferred to the host. Each bit is shifted one bit toward the lowest order bit and the lowest order bit is again checked. This process repeats until the lowest order bit is not asserted.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Overview

Figure 1:
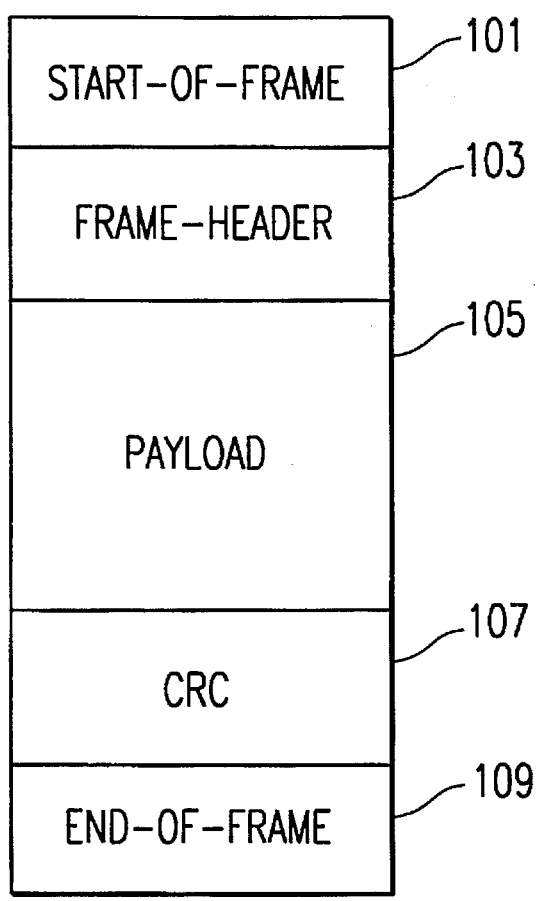
FIG. 1 is an illustration of the frame format for a Fibre Channel frame in accordance with the prior art.

The present invention is an interface device that receives frames of data (i.e., multi-byte transmissions) over a communications link. Frames of data in accordance with the present invention preferably include the fields of information, such as shown in FIG. 1 and described above. In the preferred embodiment of the present invention, each frame of data received over the communications link in accordance with the present invention is associated with a "Sequence Number" carried in a field, such as the Frame-Header 103. For the sake of brevity, a frame associated with a Sequence Number "X" will be referred to as "frame X". For example, a frame associated with the Sequence Number "102" will be referred to as "frame 102".

The Sequence Numbers associated with each frame indicate the order in which the frames are intended to be received. For simplicity, frame "000" is considered to be the first frame of a Sequence in the present explanation, and each subsequent frame in order has a Sequence Number that is one greater than the previous frame in order. Therefore, frame "102" is intended to be the 103rd frame received. Frame "102" is intended to be received immediately after a frame "101". However, it should be clear that the range of possible Sequence Numbers may begin at any number and may increment at any predetermined interval.

The present invention transfers the information carried in the payload field 105 of each frame to a host in the order that each frame is intended to be received, as determined by the Sequence Numbers. If a frame is received out of order, then the data carried in the payload field 105 is stored. Only after transferring all the data of frames that should have been received prior, is the data of the out of order frame transferred. In one embodiment of the present invention, the host to which the data within the payload field 105 is transferred is a conventional computer. Alternatively, the host may be a computer peripheral device or any other device which serves as a destination node on a communications link.

In accordance with the present invention, the "next expected frame" is defined as a frame which carries a Sequence Number that has the lowest value within a range of possible values and which has not yet been received. For example, if the range of possible Sequence Numbers is 0–65,535 (as is the case in Fibre Channel frames), then if each frame from frame "000" to frame "100" has been received, and frame "104" has also been received, the next expected frame is frame "101 ", since "101" is the smallest Sequence Number not yet received, and yet within the possible range.

The present invention preferably stores eight bits (collectively referred to as a "Missing Frame Window") within a shift register with latched outputs. Each bit indicates whether any of the next frames within a predetermined range of expected frames have been received. Alternatively, any memory means may be used to store the Missing Frame Window. The least significant bit (LSB) of the shift register is preferably associated with a next expected frame. Each other bit in order from the LSB to the most significant bit (MSB) is preferably associated with the next frame following in order. For example, if frame "003" is the next expected frame, then the LSB is associated with the frame "003". The second LSB is then associated with frame "004", the third LSB is associated with frame "005", etc. In an alternative embodiment, the MSB may be associated with the next expected frame, and thus the order of each bit is reversed.

Each bit changes state from a first logic state (deasserted) to a second logic state (asserted) when the frame associated with that bit has been received. When the LSB is asserted, the next expected frame has been received. Therefore, in accordance with one embodiment of the present invention, upon transition of the LSB, the most recently received frame is the next expected frame. Therefore, the most recently received frame can be transferred to the host, since the goal of the present invention is to transfer the frames to the host in the order expected. Once that frame has been transferred to the host, the shift register is updated with a value equal to the previous value shifted one bit toward the LSB. If the new value of the LSB is asserted, then the frame associated with that bit has been received and can be transferred to the host. If the new LSB is deasserted, then the interface device awaits receipt of the frame associated with the new LSB (i.e., waits for the LSB to be asserted).

In the preferred embodiment of the present invention, each of the parameters of the interface device may be stored in association with a particular Sequence and may then be reloaded upon receipt of a frame within that particular Sequence. This allows multiple information streams to be received and processed concurrently by the interface device.

Operational Description

Figure 2:
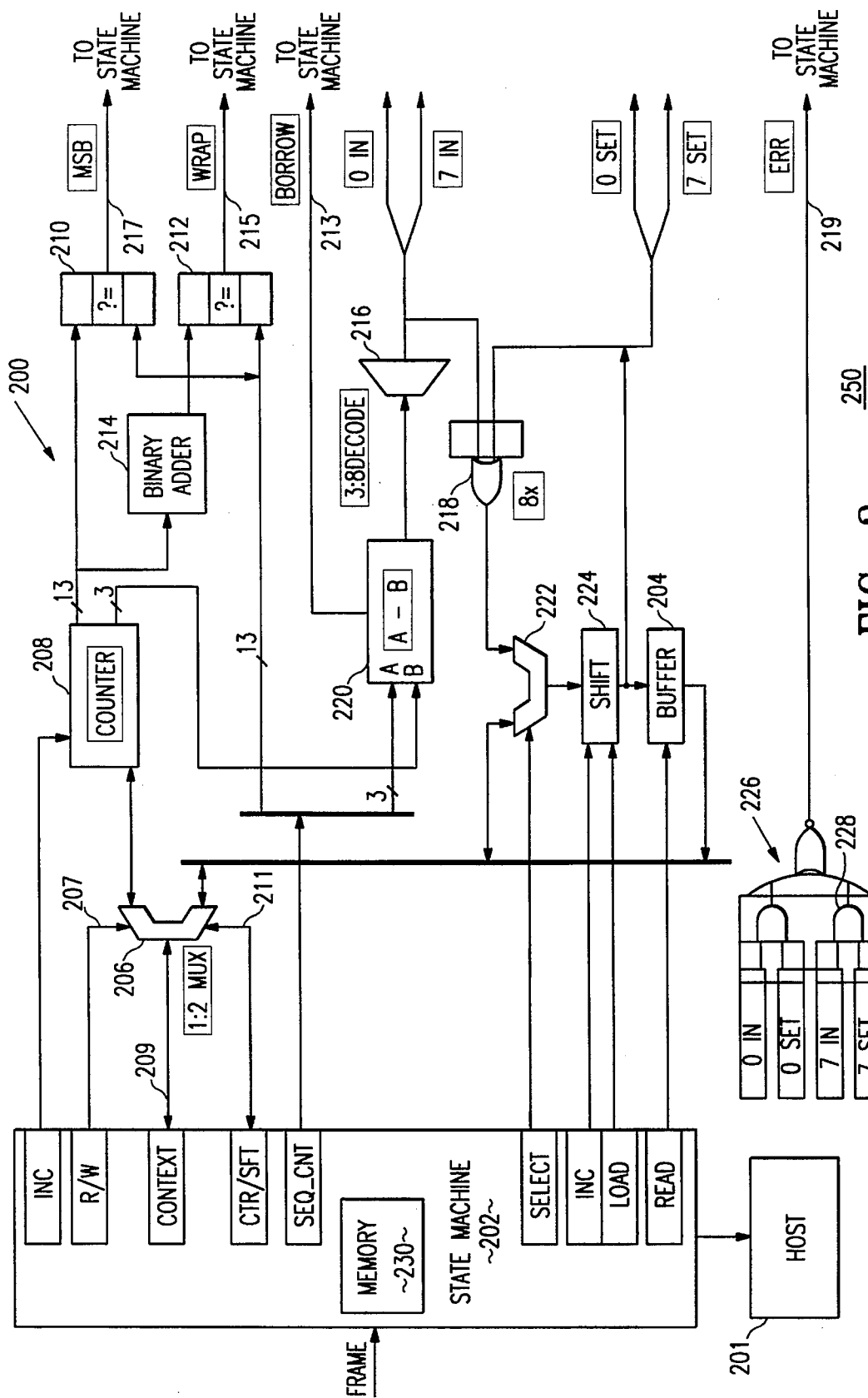
FIG. 2 is a block diagram of an interface device in accordance with the present invention.
Figure 3:
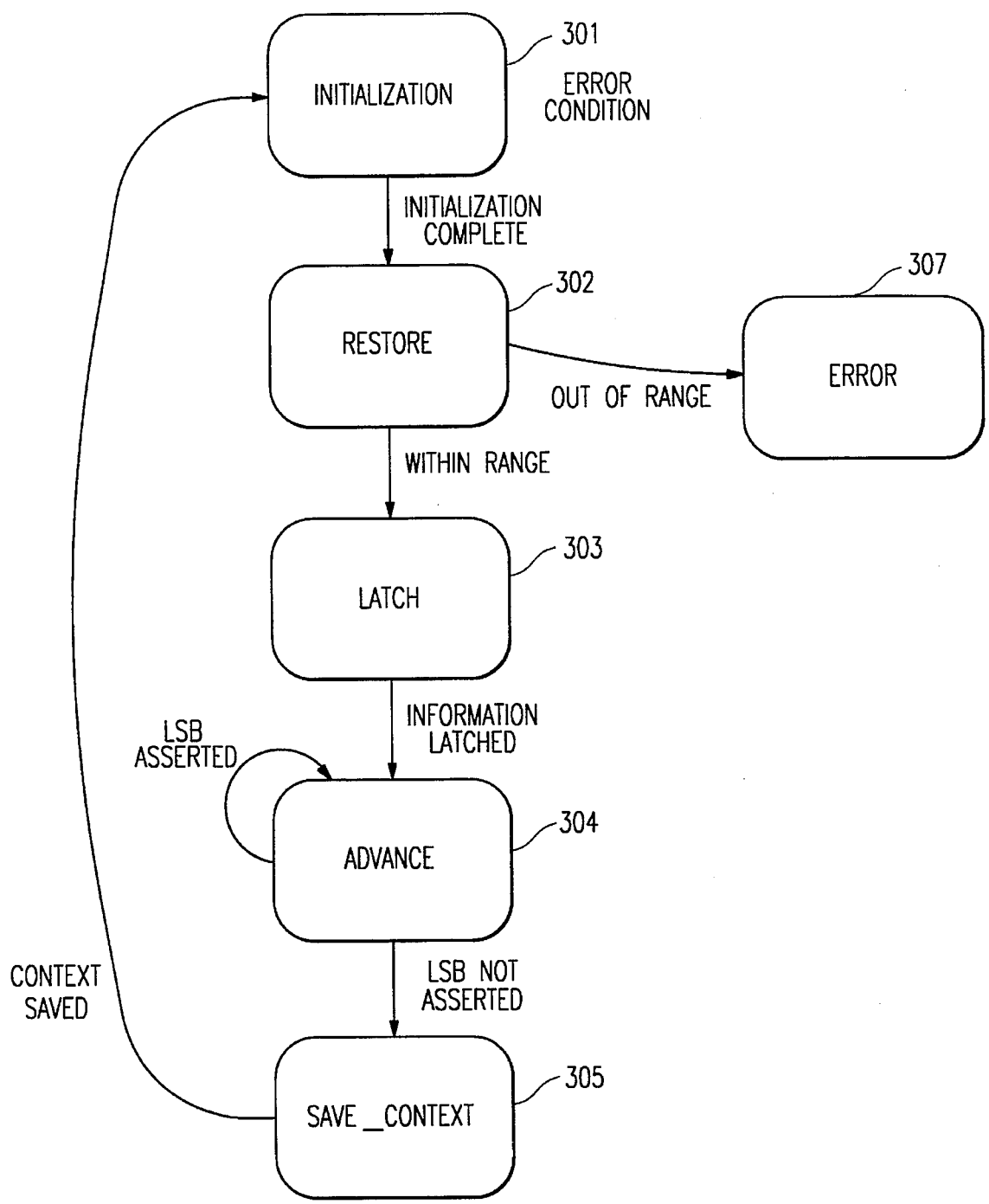
FIG. 3 is a state diagram of the states of the state machine in accordance with the present invention.

FIG. 2 is a block diagram of an interface device 250 in accordance with the present invention. The interface device 250 includes a window comparator 200 and a control device, such as a state machine 202. The state machine 202 controls the operation of the window comparator 200. The window comparator 200 includes a bidirectional 2:1 multiplexer 206, a counter 208, a first and second comparator 210, 212, a binary adder 214, a 3:8 decoder 216, eight 2-input OR gates 218, a subtractor 220, a bitmask 222, a shift register 224 with latched outputs, and a read buffer 204. The following signals are received in the state machine 202 as inputs which control the next state of the state machine 202: (1) the data received from incoming frames; (2) an MSB output signal; (3) a WRAP output signal; (4) a BORROW output signal; (5) an ERROR output signal; and (6) eight signals that represent the logical state of each bit of the shift register 224. FIG. 3 is a state diagram of the states of the state machine 202. The present invention starts upon receipt of a frame over the communications link. The state machine 202 enters INITIALIZATION state 301. When the frame is received, the state machine 202 processes the information contained in the Start-of-Frame field 101, the Frame-Header field 103, the CRC field 107, and the End-of-Frame field. The Start-of-Frame field preferably includes information that indicates whether this frame is the first frame of a Sequence. If the frame is the first frame of a Sequence, then the state machine 202 sets a first frame flag CFF flag").

Upon detecting receipt of the Frame-Header 103, the state machine 202 preferably extracts a Sequence Identification (SEQ-ID) value and Sequence Counter (SEQ-CNT) value from the Frame-Header 103 and stores these values in a memory 230 within the state machine 202. In an alternative embodiment, the memory 230 may be external to the state machine 202. The SEQ-CNT is the Sequence Number of the frame. The SEQ-ID determines the particular Sequence with which the frame is associated. In an alternative embodiment of the present invention, the frame does not indicate the SEQ-ID. In such an alternative embodiment, frames of a first Sequence should all be received before frame of a second Sequence can be received.

In addition, in INITIALIZATION state 301, each byte of information carried in the payload field 105 is separated from the overhead information carried in the other fields 101, 103, 107, 109 of the frame. The byte information is then preferably stored in a data field buffer within the memory 230. The length and the location of the buffer are preferably stored in the memory 230 in variables "DATA-LENGTH [x]" and "ADDR-PTR[x]", where "x" is a unique value associated with the particular frame (preferably by association with the SEQ-ID and SEQ-CNT associated with the frame).

The state machine then enters RESTORE state 302. In RESTORE state 302, the state machine loads the counter 208 and the shift register 224 with values associated with the SEQ-ID of the received frame. By allowing loading of the counter 208 and shift register 224 each time a new frame is received, the present invention ensures that the interface device can handle frames associated with a first Sequence interspersed with frames associated with at least a second Sequence.

If the FF flag is asserted, the state machine 202 loads both the shift register 224 and the counter 208 with the value of the Sequence Number associated with the first frame of the Sequence (preferably zero). If the FF flag is not asserted, then the state machine 202 loads the counter 208 and the shift register 224 with values that were previously saved in connection with the Sequence identified by the SEQ-ID. The values to be loaded into the counter 208 and shift register 224 are preferably identified by a table lookup indexed on the SEQ-ID. In an alternative embodiment of the present invention, the values to be loaded into the counter 208 and shift register 224 may be identified by use of a content-addressable memory, translation-lookaside buffer, or any other means for properly associating the values to be restored with the Sequence with which the last received frame is associated.

The state machine 202 controls a read/write signal coupled to the multiplexer 206 over a signal line 207 to cause the multiplexer 206 to receive input from the state machine 202 over signal line 209. A multiplexer select signal is coupled from the state machine 202 to the multiplexer 206 on a select signal line 211. The select signal determines whether the output from the multiplexer is coupled to either the shift register 224 via the bitmask 222 or to the counter 208. The bitmask 222 is a two input multiplexer that determines whether the inputs to the shift register 224 are coupled to the multiplexer 206 or to the outputs of the OR gates 218. The value loaded in the shift register 224 is then latched in the shift register 224. The value in the shift register 224 represents the Missing Frame Window and indicates whether a particular frame has been received. In an alternative embodiment, the OR gates 218 may have tri-state outputs.

In the preferred embodiment of the present invention, both the counter 208 and the SEQ-CNT are preferably 16 bits wide. The three least significant bits of the SEQ-CNT are coupled to a first input to the subtractor 220. The least significant three bits of the output from the counter 208 are coupled to a second input to the subtractor 220. The three least significant bits output from the counter 208 are subtracted from the three least significant bits from SEQ-CNT of the first frame to aid in determining whether the most recently received frame is represented by a bit within the Missing Frame Window. It should be noted that more or less than the three least significant bits can be subtracted, depending upon the range of out of order frames that are to be acceptable. For example, if frames that are within a range of sixteen values relative to the value of the next expected frame are acceptable, then the four least significant bits of the output from the counter 208 and from the SEQ-CNT would be coupled to the subtractor 220.

In the preferred embodiment, the three bits output from the subtractor 220 are coupled to the 3:8 decoder 216. The output of the decoder 216 is eight signal lines, only one of which is asserted at any one time. The particular signal line to be asserted is determined by the state of the three signal lines output from the subtractor 220 and coupled to the input of the decoder 216. Since there are eight possible combinations of logic states on the three input lines, each output line corresponds to a unique one of the eight combinations of the logic states possible on the three input lines. Accordingly, each output line from the decoder 216 represents a unique modulo-8 difference between the value of the SEQ-CNT signal and the value of the counter 208.

Each of the eight output signals from the decoder 216 is associated with one of the eight logical OR gates 218, one of eight inputs to the bitmask 222, one of eight outputs from the bitmask 222, one of eight inputs to the shift register 224, and one of eight parallel output lines from the shift register 224. Each of the eight output signals from the decoder 216 is coupled to the first input of the associated logical OR gate 218. The output of each OR gate 218 is coupled to the associated bitmask input. Each output from the bitmask 222 is coupled to the associated input to the shift register 224. Each output from the shift register 224 is then coupled to the second input to the associated OR gate 218. The particular decoder output associated with an input value of zero (i.e., the "zero" output) is coupled to the LSB of the bitmask 222, the "1" output is coupled to the bit of the bitmask 222 adjacent the LSB, and each other decoder output bit in order from the "2" to "7" is coupled to the bitmask input next in order. It should be noted that in RESTORE state 302, the bitmask input coupled to the multiplexer 206 is coupled to the input to the shift register 224.

Since the output of the decoder 216 represents the state of only the least significant three bits of the counter value and the SEQ-CNT value, the more significant output signals (i.e., bits 3–15) from the counter 208 and SEQ-CNT must also be taken into consideration in determining whether the most recently received frame is within the range of frames represented by the bits of the Missing Frame Window (i.e., within a predetermined range of values relative to the value of the next expected frame). The more significant output signals are coupled to the input of the binary adder 214 and to the first comparator 210. The first comparator 210 indicates that the higher order bits output from the counter 208 and the higher order bits of the SEQ-CNT are equal by asserting the MSB signal at the output of the comparator 210.

In the preferred embodiment of the present invention, the output of the binary adder 214 is a 13-bit output that represents a binary value one greater than the value input to the adder 214. The output of the adder 214 is coupled to the input of the second comparator 212. The second comparator 212 compares the value represented by the more significant bits of the output of the counter plus one, with the more significant bits of the SEQ-CNT value. If these values are equal, then a WRAP signal output of the comparator 212 is asserted. The WRAP signal is used in combination with a BORROW signal output from the subtractor 220 to identify the case in which the value stored in the counter 208 is: (1) less than the value of the SEQ-CNT value (i.e., the Sequence Number of the most recently received frame is greater than the Sequence Number of the next expected frame) and (2) within a range of eight from the SEQ-CNT.

The combination of the MSB, BORROW, and WRAP signals provides a positive indication that the last frame received is associated with a Sequence Number that is greater than the Sequence Number of the next expected frame, and is within a predefined range relative to the value of the next expected frame (eight in the present example).

Therefore, if the MSB signal is asserted on the MSB signal line 217, then the most significant 13 bits of the counter 208 (which holds the value Sequence Number associated with the next expected frame) are equal to the most significant 13 bits of the SEQ-CNT (i.e., the Sequence Number associated with the last received frame). Accordingly, if the MSB signal is asserted, then the least significant three signals of SEQ-CNT must be equal to, or greater than, the three least significant signals of the Sequence Number associated with the next expected frame (the least significant bits of the value stored in the counter 208), as indicated by the BORROW signal being deasserted. If the BORROW signal is asserted, then the SEQ-CNT is in error (i.e., is less than the Sequence Number of the next expected frame, and thus out of the predetermined range of values relative to the value of the next expected frame). Likewise, if the WRAP signal is asserted, then the three least significant bits of SEQ-CNT must be less than the three least significant bits of the value stored in the counter 208, as indicated by the BORROW signal being asserted. Otherwise, the most recently received frame is outside the range of valid frames and an error condition exits.

An additional error checking circuit 226 verifies that the last received frame is not associated with the same Sequence Number as a previously received frame. This is accomplished by comparing in eight discrete AND gates 228 each output from the decoder 216 with the associated output from the shift register 224. If the MSB signal is asserted, the BORROW signal is deasserted, and both an output from the decoder 216 and an associated output from the shift register 224 are asserted, then the last received frame is associated with the same Sequence Number as a previously received frame. Likewise, if the WRAP signal is asserted, the BORROW signal is asserted, and both an output from the decoder 216 and an associated output from the shift register 224 are asserted, then the last received frame is associated with the same Sequence Number as a previously received frame. In either of these cases, the state machine 202 enters an ERROR state 307. If the states of the WRAP, MSB, BORROW, and ERROR signals indicate that an error has occurred, the state machine 202 preferably asserts an interrupt request line to the host 201 to request assistance in dealing with the error condition. Alternatively, the state machine 202 may be intelligent enough to deal with error conditions without requesting assistance from the host 201. In either case, the particular action that is taken after detection of an error condition is outside the scope of the present invention.

If the state machine 202 determines that the SEQ-CNT value is within the predetermined range and is not equal to a previously received frame, the state machine enters LATCH state 303. In LATCH state 303, the state machine 202 causes the output signals from the OR gates 218 to be coupled to the parallel input of the shift register 224 through the bitmask 222 by controlling the select signal to the bitmask 222. By ORing the previous value of the shift register 224 with the outputs of the decoder 216, those bits in the shift register 224 that were previously asserted remain asserted. Accordingly, if the value loaded into the shift register 224 in RESTORE state 302 had bits asserted to indicate that frames had been previously received out of order, such information would be retained and supplemented by asserting the additional bit represented by the output from the decoder 216. The state machine 202 then causes the input signals to be loaded into the shift register 224. The output of the shift register 224 then indicates which frames within the predetermined range of values relative to the value associated with the next expected frame have been received.

The state machine 202 then enters ADVANCE state 304. In ADVANCE state 304, the state machine 202 checks whether the LSB of the latch 204 is asserted. If the LSB of the latch 204 is asserted, then the last received frame is the next expected frame. The state machine 202 then uses the variables DATA-LENGTH, and ADDR-PRT to identify the location of the data buffer for the byte information stored in memory and associated with the counter value (i.e., the last received frame). The byte information is recovered and then transferred to the host 201.

The state machine 202 increments the counter 208 by one and causes the contents of the shift register 224 to be shifted one bit toward the LSB. If the new LSB is asserted, then the state machine remains in ADVANCE state 304 and uses the variables DATA-LENGTH, and ADDR-PTR to identify the location of the byte information stored in memory and associated with the new counter value. The byte information is recovered and then transferred to the host 201. The counter 208 is again incremented and the value of the shift register 224 is again shifted one bit toward the LSB. This process continues until the LSB is zero. If the new value of the LSB is zero, then the state machine 202 enters SAVE_CONTEXT state 305. In SAVE_CONTEXT state 305, the values of the Counter 208 and shift register 224 are saved in the memory 230. The state machine 202 preferably receives the value from the shift register 224 through the buffer 204 and multiplexer 206. In addition, the current contents of DATA-LENGTH, and ADDR-PTR are also saved.

The state machine 202 then returns to INITIALIZATION state 301 and awaits receipt of the next frame. When a next frame is received, the SEQ-ID and SEQ-CNT are extracted to determine the address of the context to be restored to the counter 208 and shift register 224 (i.e., the values that were last maintained in the counter 208 and shift register 224 in connection with the last frame that was associated with the same Sequence). The byte information carried in the payload field 105 is buffered in memory at a location identified by the variables DATA-LENGTH, and ADDR-PTR (each of which is associated with the SEQ-CNT of this frame) until it is determined that this frame is the next expected frame (and consequently, the counter value is equal to the SEQ-CNT of this frame). The new contents of the shift register 224 is then loaded into the latch 204. The comparators 210, 212 of the Window Comparator 200 then provide the logic state of the WRAP, BORROW, and MSB signals based upon the value of the SEQ-CNT and the new counter value.

If these signals indicate that the SEQ-CNT is within the range of values relative to the value of the next expected frame, then the state machine 202 enters ADVANCE state 304 once again. The LSB of the latch 204 is once again checked. If the new LSB is asserted, then the state machine 202 uses the variables DATA-LENGTH, and ADDR-PTR associated with the value of the counter 208 to identify the location of the byte information stored in memory. The byte information is recovered and then transferred to the host 201. The state machine 202 again increments the counter 208 and shifts the contents of the shift register 224 one bit toward the LSB. If the new LSB is asserted, the variables DATA-LENGTH, and ADDR-PTR associated with the value of the counter 208 identify the location of the byte information stored in memory. The byte information is recovered and then transferred to the host 201. The state machine 202 again enters ADVANCE state 304, increments the counter 208, and shifts the contents of the shift register 224 one bit toward the LSB. This process is repeated until the new LSB is not asserted.

When LSB of the latch 204 is not asserted, the last received frame was not the next expected frame. The state machine 202 then enters SAVE_CONTEXT state 305 and saves the values of the shift register 224 and the counter 208, as well as the values of the DATA-LENGTH, and ADDR-PTR. Next, the state machine 202 enters INITIALIZATION state 301 and awaits the receipt of the next frame. This procedure is continuously repeated.

The present invention has several advantages over the prior art. The implementation of the present invention allows the invention to be embodied using simple logic elements, making it suitable for embedding in digital electronic communications systems. Furthermore, the present invention provides a simple mechanism to allow a higher level control function to determine the state of the interface device and force an alternate state. This facilitates "context switching", or the parallel use of a relatively complex machine by alternatively saving and restoring simple state information (i.e., the values of the counter and shift register). In addition, if frames have a field that identifies the particular Sequence, the present invention is capable of multiplexing between multiple streams of data by updating the values of the counter and shift register with values relevant to the Sequence of the last received frame. Because the present invention requires very little processor intervention, there is very low latency between the receipt of the next expected frame and the transfer to the host of the data carried in the payload field of that frame. If frames are received by the interface device in sequential order, then there is very little delay in the transfer of the payload information to the host for each frame. Since the Missing Frame Window identifies a predefined range of frames that may be received, an indication that a frame is out of the range allows the invention to indicate when temporary storage is, or would be, overburdened. The present invention also indicates an error condition when the same frame has been received twice. Still further, the present invention easily accommodates transmission protocols in which the length of the received information varies between deliveries and where the nature of the variations is unpredictable by the receiver.

A number of embodiments of the present invention have been described. Nevertheless, it will be understood that various modifications may be made without departing from the spirit and scope of the invention. For example, the present invention is described in the context of a state machine which controls the operation of the window comparator. However, any circuitry, such as discrete logic, programmed general purpose computer, or programmable logic array may be used to perform the functions of the state machine described above. Likewise, the window comparator circuit of the present invention can be implemented in any means, such as, programmed general purpose computer, programmable logic array, or state machine. Furthermore, the number of bits (i.e., the range of the Missing Frame Window) may vary from the 8-bits described in the exemplar. Accordingly, it is to be understood that the invention is not to be limited by the specific illustrated embodiment, but only by the scope of the appended claims.

I claim:

1. An interface device for coupling a receiving device to a communications link and for ensuring that frames of data received by the interface device, each frame being included within a sequence of frames, are communicated to the receiving device in a predetermined order defined by an external transmitting device, the interface device including:

(a) a control circuit for processing information contained in each frame of data; and (b) a comparator window circuit coupled to, and controlled by, the control circuit, wherein each valid frame received by the interface device is associated with a value that indicates the relative position of that frame within the predetermined order, the comparator window circuit having:

(1) a missing frame window storing means for storing a missing frame window which indicates whether the last received frame is the next expected frame in the order defined by the external transmitting device, (2) a counter, operatively coupled to the control circuit, for storing the value associated with the next expected frame and capable of incrementing the value stored in the counter by a predetermined value upon command from the control circuit when the missing frame window indicates that the last received frame is the next expected frame, (3) a comparator, coupled to the counter and the control circuit, for comparing a value associated with the next expected frame with a value associated with a last received frame and indicating whether the value associated with the last received frame is within a predetermined range of values relative to the value of the next expected frame, and (4) a shift register coupled to the control circuit and coupled to an input to the missing frame window storing means, such that a missing frame window input to the missing frame window storing means may be shifted under the control of the control circuit prior to being stored in the missing frame window storing means when the missing frame window indicates that the last received frame is the next expected frame.

2. The interface device of claim 1, wherein received frames include information that identifies a sequence in which the frame is included, and the comparator window circuit further includes a loading means, coupled to the missing frame window storing means, for loading the missing frame window storing means with a missing frame window associated with the sequence of the last received frame.

3. The interface device of claim 1, wherein the control circuit transfers data received by the interface device within a select frame, only after determining from the missing frame window that the select frame is the next expected frame.

4. The interface device of claim 1, wherein the control circuit transfers data received by the interface device within a select frame only after determining from the comparison means and the missing window frame that the select frame is currently the next expected frame and the select frame was associated with a value within the predetermined range of values at the time the select frame was received.

5. The interface device of claim 4, wherein: (1) the control circuit has value signal lines that output the binary value associated with the last received frame, (2) the counter has output signal lines that output the binary value of the counter, and (3) the comparator window circuit further includes:

(a) a first comparator having an output and a first and second input, the first input coupled to the output signal lines of the counter, the second input coupled to the value signal lines, and the output of the first comparator coupled to the control circuit, the first comparator for determining when the value associated with the last received frame is within a predetermined range of values relative to the value of the counter;

(b) an adder having an input and an output, the input coupled to the output signal lines of the counter, for outputting a value that is greater than the value of the counter; and (c) a second comparator, having an output and a first and a second input, the first input coupled to the output of the adder, the second input coupled to the output signal lines of the counter, and the output of the second comparator being coupled to the control circuit, the second comparator for comparing the output of the adder to the value of the counter and providing the result of the comparison to the control circuit;

(d) a subtractor having an output, a first input, and a second input, the first input coupled to at least one of the least significant output lines from the counter, and the second input coupled at least one of the least significant output lines from the control circuit, for representing in binary form, the difference between the value represented on the least significant lines of the counter and the value represented on the least significant lines from the control circuit;

(e) a decoder having an input and an output, the output including a plurality of output signal lines, each output signal line being associated with a unique binary input value coupled to the decoder from the subtractor; and (f) a plurality of two-input OR gates, each OR gate being associated with a unique one of the decoder output signal lines, a first input of each OR gate being coupled to the associated decoder output signal line, the output of each OR gate being coupled to a unique input to the missing frame window storing means for storing values indicative of the values associated with frames received by the interface device.

6. The interface device of claim 4, wherein the comparator window circuit further includes:

(a) means for determining whether a predetermined number of high order bits of the value associated with the last received frame are equal to or one greater than an equal number of high order bits of the value associated with the next expected frame;

(b) means for asserting one of a plurality of difference signal lines, each difference signal line associated with a unique value, when the difference between the least significant bits of the value associated with the last received frame and an equal number of the least significant bits of the value associated with the next expected frame is equal to the unique value associated with the difference signal line to be asserted; and (c) a plurality of two-input OR gates, each OR gate being associated with a unique one of the plurality of difference signal lines, a first input of each OR gate being coupled to the associated difference signal line, the output of each OR gate being coupled to a unique input to the missing frame window storing means for storing values indicative of the values associated with frames received by the interface device, each value being within a predetermined range of values relative to the next expected frame, the second input of each OR gate being coupled to an output from the missing frame window storing means.

* * * * *